Feb. 11, 1936.   W. N. GOODWIN, JR   2,030,250
LIGHT TARGET FOR ILLUMINATION METERS
Filed Sept. 27, 1932
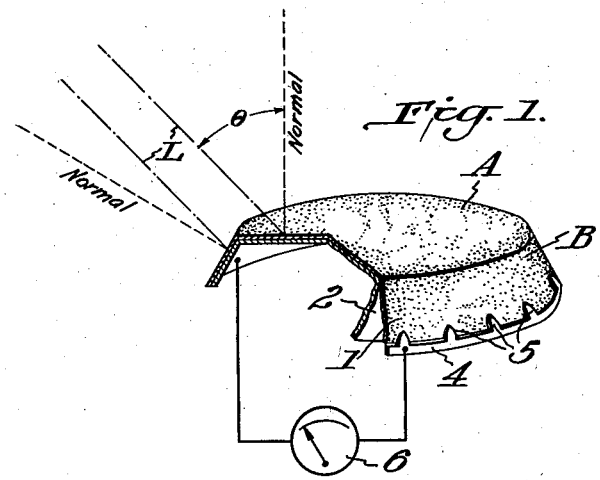
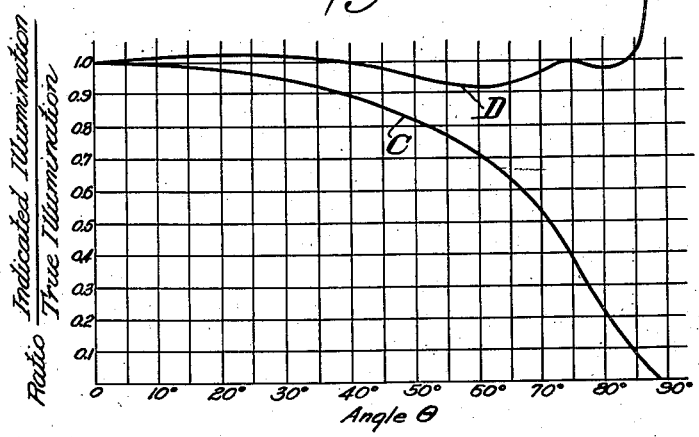
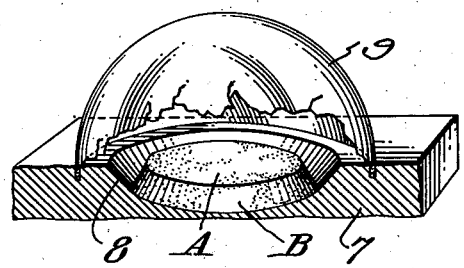
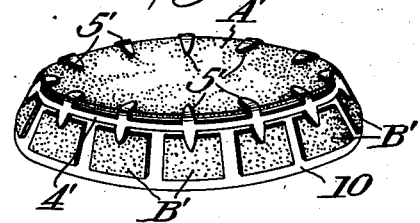
Inventor:
William Nelson Goodwin, Jr.,
By Byrnes, Townsend & Potter,
Attorneys.

Patented Feb. 11, 1936

2,030,250

UNITED STATES PATENT OFFICE 2,030,250

LIGHT TARGET FOR ILLUMINATION METERS

William Nelson Goodwin, Jr., Newark, N. J., assignor to Weston Electrical Instrument Corporation, Newark, N. J., a corporation of New Jersey Application September 27, 1932, Serial No. 635,124

12 Claims. (Cl. 136—89)

This invention relates to light targets for illumination meters and particularly to a photoelectric cell of novel shape and a mounting therefor.

One known type of illumination meter comprises a photoelectric cell and an instrument for measuring the electrical effect or current flow produced when light strikes the photoelectric cell. That part of the apparatus which is directed towards the light, or upon which the light is directed, is known as the "light target" and usually comprises a casing in which a cell having a plane active surface is mounted under and parallel to a flat glass window. Targets of this type are open to the objection that, for a beam of parallel light rays of a given intensity, the instrument reading varies with the angle of incidence of the light rays. The response of the cell is a maximum when the beam is normal to the glass window and the active surface of the cell, and decreases as the angle of incidence varies from normal. This effect is due to the fact that the cell is not equally affected by light reaching it at different angles, the spectral reflection from the surfaces of the glass window cause an effective loss of light which varies from about 8% for normal incidence up to 100% at 90° from normal, and the rim of the light target may cast a shadow upon the cell.

An object of the invention is to provide a photo-electric cell having a response which is substantially independent of the angle of incidence of the light.

Another object is to provide a light target including a photoelectric cell, the cell and its casing being so designed and arranged as substantially to eliminate those variations which usually arise from changes in the angle at which light strikes the target. More specifically, an object is to provide a photoelectric cell of the direct action type, and in which the active surface of the cell is arranged in different planes, whereby a variation in the inclination of a light beam which decreases the response of one portion of the active surface increases the response of another portion of the cell. A further specific object is to provide a light target in which the photoelectric cell and its casing are so shaped that the electrical response is substantially constant for all angles of incidence of the light.

These and other objects and advantages of the invention will be apparent from the following specification, when taken with the accompanying drawing, in which, Fig. 1 is a perspective view, with parts in section, of a photoelectric cell embodying the invention and with the circuit connections to a measuring instrument shown diagrammatically;

Fig. 2 is a curve sheet showing the variations of electrical response, for different angles of incidence, of the novel cell and for the known plane surface cell;

Fig. 3 is a perspective view, with parts in section, of a light target embodying the invention; and Fig. 4 is a perspective view of another embodiment of the invention.

In the drawing, the reference character A identifies the plane top or active surface of a photo-electric cell which is provided with a depending and outwardly flaring apron B. The cell is preferably of the current generating type and comprises a layer 1 of light sensitive material on a back metal electrode 2. A ring member 4 having fingers 5 to collect the current from the light sensitive material serves as one terminal of the photoelectric cell and the back electrode 2 constitutes the other terminal. A current measuring instrument 6 connected between these terminals will indicate the current response of the photoelectric cell when light strikes upon the active surfaces A and B.

Photoelectric cells of this general type have a maximum current response for light rays which are normal to the active surface. As the direction of the light varies from normal incidence by increasing values of the angle $\theta$, the response of the section A of the photoelectric cell falls off at the same rate as that of the known types of plane surface cells. In Fig. 2, the curve C shows the relationship, for a known cell having a plane active surface under a flat glass window and for constant illumination, between the angle of incidence and the ratio of the indicated illumination at that angle to the true illumination. It will be noted that the current response is decreased 10% when the angle of incidence departs from normal by about 40°.

In accordance with the invention, the active surface of the photoelectric cell includes portions arranged at angles to each other and, for a beam of parallel rays L, the angle of incidence on one portion approaches normal as it departs from normal on another portion of the active surface. As the total current response includes components due to the plane section A and the inclined section B, the variation in response for changing angles of incidence may be substantially compensated for deviations from normal incidence on the section A, up to approximately 90°. The curve D of Fig. 2 shows the response of the novel form of cell for angles of incidence up to about 87° from normal. It will be noted that the current output departs from its correct value by not more than 8% for all angles of incidence up to about 86° from normal.

As shown in Fig. 3, the light target of an illumination meter may include a photoelectric cell having a plane active section A and a flaring section B, the photoelectric cell being mounted in a recess in a casing or base member 7. The walls 8 of the member 7 flare away from the base of the photoelectric cell at an angle which, when the active surface A is flush with the surface of the casing member 7, is somewhat less than 45°. With this relationship, the rim of the casing will cast a shadow upon a part of the flaring surface B for larger angles of incidence, and thus prevent the current response from rising to abnormal and inaccurate values for angles of incidence which approach 90°.

To reduce the spectral reflection of light from the glass cover 9, and prevent undue variations in it, this member is domed or of hemispherical shape, and thus effects a substantially constant reflection for all angles of incidence.

As shown in Fig. 4, the plane section A' of the photoelectric cell may be formed as one unit, and the flaring or inclined section may be formed as a separate unit or, as illustrated, as a plurality of sections B'. In this construction, the terminal member for contacting the collecting electrodes of the several sections takes the form of a ring member 4' having fingers 5' which engage the light sensitive material of the sections A' and B'. The second terminal of such an assembled cell structure is a conducting member 10, in the form of a truncated cone, which supports the sections A', B', and is in electrical contact with the back electrodes of the cell sections.

The described target having a photoelectric cell with active surface arranged as the frustrum of a cone will compensate for variations of the inclination of light beams throughout the entire circumference of 360°. The illustrated frustrum of a cone is one limiting form of a frustrum of a pyramid and it will be apparent that the conical surface may be replaced by a true pyramidal surface formed of plane surfaces of a desired width. For special cases in which the possible variation is limited to one plane, or to a circumferential angle of less than 360°, it is obvious that the inclined section B need not extend around the entire periphery of the plane section A. In the limiting case in which the possible variation of the angle of incidence is restricted to but one plane, the photoelectric cell may comprise two plane active surfaces arranged at an angle to each other, and each normal to the plane in which variation of the angle of incidence may be expected.

In any case the exact angle at which the component active surfaces are arranged will depend upon the current response characteristic of the particular photoelectric cell structure for different angles of incidence of light. The angular arrangement of the active surfaces and the relative levels of the plane section of the photoelectric cell and the surface of the casing member 7 will affect the exact angle of the flaring wall 8 of the casing member.

So far as I am aware, it is broadly new to neutralize the effect of variations in the angle of incidence of light upon a light target by providing a light responsive device having active surfaces at angles to each other. Various angular arrangements of plane and/or curved active surfaces of photoelectric cells may therefore be employed without departure from the spirit of the invention, as set forth in the following claims.

I claim:

1. A photoelectric device comprising a light-sensitive element having substantially the form of a hollow truncated pyramid with one end wall and a pyramidal wall flaring outwardly therefrom, the active surface of said element including one face of said end wall and at least a portion of the adjacent face of the pyramidal wall.

2. A photoelectric device comprising a light-sensitive element having substantially the form of a hollow truncated pyramid with one end wall and a peripheral wall flaring outwardly therefrom, the active surface of said element including the end wall and at least a portion of the peripheral wall.

3. A light target comprising a base member and a photoelectric cell mounted thereon, said cell including a main section having a light-sensitive surface extending substantially at right angles to light rays reaching said cell from a predetermined direction and auxiliary sections having light-sensitive surfaces inclined to the active surface of the main section to intercept light rays which are inclined to the said predetermined direction by an angle of less than 90°, and said base section having a wall outwardly flared from said photoelectric cell to form a recess within which the active surfaces of said cell are positioned.

4. A light target comprising a base member having an outer surface, a wall flaring inwardly from the said outer surface to define a recess whose inner end is of less diameter than the diameter of the junction of said flaring wall and the said outer surface, and a photoelectric cell located substantially wholly within said recess and including a plurality of active surfaces presented at different angles to light rays approaching said target from within a solid angle of 180°.

5. A light target as claimed in claim 4, wherein the inclination of said flaring wall is such that a shadow is cast upon said photoelectric device by light rays which depart by a predetermined angle from light rays which reach the photoelectric device in a direction normal to the said outer surface of the base member.

6. A light target as set forth in claim 4, wherein said photoelectric device includes a section having a plane active surface substantially parallel to the said outer surface of the base member and an active surface inclined at an angle to said plane active surface to intercept light rays inclined at less than substantially 90° to a direction normal to said plane active surface, the inclination of said flaring wall being such that a shadow is cast upon said inclined active surface when the angle of light incidence is approximately at right angles to a line normal to said plane active surface.

7. In a light target, a base member having a wall extending inwardly and contracting inwardly from the face of said base member to define a flaring recess, and a photoelectric device in said recess and comprising an outer plane light sensitive surface parallel to the face of said base member and a light sensitive surface flaring outwardly therefrom.

8. A light target comprising a base member, and a photoelectric cell mounted thereon, said cell having active sections whose light-sensitive surfaces are arranged at an angle of between 180° and 270° to each other, and said base member having a wall outwardly inclined from said photoelectric cell to form a recess within which the active surfaces of said cell are positioned.

9. The invention as set forth in claim 7, in combination with a light transmitting cover on said base and enclosing said photoelectric device, said cover being domed to effect a substantially constant spectral reflection of light irrespective of the angle of incidence of light thereon.

10. A photoelectric device comprising a base electrode having portions defining the smaller end wall and the pyramidal walls of a hollow truncated pyramid, a layer of light-sensitive material upon one surface of said end wall and the adjacent surface of said pyramidal wall of said base electrode, and a collecting electrode means in contact with said layer of light sensitive material at the face thereof opposite said base electrode.

11. A photoelectric device comprising a base electrode having portions defining the smaller end and peripheral surfaces of a hollow truncated pyramid, a layer of light-sensitive material on said portions of the base electrode, and a collecting electrode in contact with the light-sensitive layer at the surface thereof opposite said base electrode.

12. A photoelectric device comprising a conducting support having the form of a truncated pyramid, a plurality of photoelectric cell sections on and with their respective back electrodes in contact with said support, and a terminal member having portions in contact with the light-sensitive material of each of said cell sections.

WILLIAM NELSON GOODWIN, JR.